(12) United States Patent
Giridharan et al.

(10) Patent No.: US 12,146,662 B2
(45) Date of Patent: Nov. 19, 2024

(54) FUEL-AIR MIXING ASSEMBLY IN A TURBINE ENGINE

(71) Applicant: GENERAL ELECTRIC COMPANY, Schenectady, NY (US)

(72) Inventors: Manampathy G. Giridharan, Evendale, OH (US); Ajoy Patra, Bengaluru (IN); Pradeep Naik, Bengaluru (IN); R Narasimha Chiranthan, Bengaluru (IN); Perumallu Vukanti, Bengaluru (IN); Michael T. Bucaro, Arvada, CO (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 18/482,949

(22) Filed: Oct. 9, 2023

(65) Prior Publication Data
US 2024/0151396 A1  May 9, 2024

Related U.S. Application Data

(63) Continuation of application No. 17/586,082, filed on Jan. 27, 2022, now Pat. No. 11,815,269.

(60) Provisional application No. 63/294,573, filed on Dec. 29, 2021.

(51) Int. Cl.
*F23R 3/28* (2006.01)

(52) U.S. Cl.
CPC .................................. *F23R 3/286* (2013.01)

(58) Field of Classification Search
CPC ......................................................... F23R 3/286
See application file for complete search history.

(56) References Cited

U.S. PATENT DOCUMENTS

| | | | |
|---|---|---|---|
| 3,917,173 | A | 11/1975 | Singh |
| 5,408,830 | A | 4/1995 | Lovett |
| 5,675,971 | A | 10/1997 | Angel et al. |
| 5,822,992 | A | 10/1998 | Dean |
| 6,415,594 | B1 | 7/2002 | Durbin et al. |
| 6,810,673 | B2 | 11/2004 | Snyder |
| 6,874,323 | B2 | 4/2005 | Stuttaford |
| 9,103,547 | B2 | 8/2015 | Eroglu et al. |
| 10,101,031 | B2 | 10/2018 | Williams et al. |
| 10,408,457 | B2 | 9/2019 | Akiyama et al. |
| 10,935,245 | B2 * | 3/2021 | Boardman ............... F02C 7/22 |
| 2007/0271927 | A1 | 11/2007 | Myers et al. |
| 2008/0163627 | A1 | 7/2008 | ELKady et al. |

(Continued)

FOREIGN PATENT DOCUMENTS

| | | |
|---|---|---|
| EP | 1736707 B1 | 1/2018 |
| GB | 2462905 A1 | 3/2010 |

(Continued)

*Primary Examiner* — William H Rodriguez
(74) *Attorney, Agent, or Firm* — McGarry Bair PC

(57) ABSTRACT

A turbine engine that includes an engine core having at least a compressor section and a combustion section. The combustion section includes a combustor. The combustor section or combustor includes a fuel-air mixing assembly fluidly coupled to the compressor section. The fuel-air mixing assembly includes an outer wall, a center body at least partially circumscribed by the outer wall, and an annular flow passage between the outer wall and center body. At least one fuel orifice includes a fuel outlet fluidly coupled to the annular flow passage.

20 Claims, 12 Drawing Sheets

(56) References Cited

U.S. PATENT DOCUMENTS

| | | |
|---|---|---|
| 2009/0113893 A1 | 5/2009 | Li et al. |
| 2010/0101229 A1 | 4/2010 | York et al. |
| 2011/0314827 A1 | 12/2011 | Khosla et al. |
| 2012/0079829 A1 | 4/2012 | Berry et al. |
| 2012/0097757 A1 | 4/2012 | Bathina |
| 2013/0086910 A1 | 4/2013 | Khan et al. |
| 2013/0219899 A1 | 8/2013 | Uhm et al. |
| 2014/0338338 A1 | 11/2014 | Chila et al. |
| 2016/0186662 A1* | 6/2016 | Stewart .............. F23R 3/14 239/403 |
| 2016/0186663 A1* | 6/2016 | Stewart .............. F23R 3/286 60/737 |
| 2016/0363319 A1 | 12/2016 | Monahan et al. |
| 2017/0122211 A1 | 5/2017 | Zhang et al. |
| 2017/0343217 A1 | 11/2017 | Chen et al. |
| 2018/0128489 A1 | 5/2018 | Boardman et al. |
| 2018/0128490 A1 | 5/2018 | Boardman et al. |
| 2018/0128491 A1 | 5/2018 | Boardman et al. |
| 2019/0107053 A1 | 4/2019 | Miyamoto et al. |
| 2019/0271470 A1* | 9/2019 | Boardman .............. F23R 3/283 |
| 2020/0025385 A1 | 1/2020 | Boardman et al. |
| 2020/0158343 A1* | 5/2020 | Boardman .............. F23R 3/18 |
| 2020/0263873 A1* | 8/2020 | Boardman .............. F02C 7/22 |
| 2021/0010674 A1 | 1/2021 | Thariyan et al. |
| 2021/0207808 A1 | 7/2021 | Mishra et al. |
| 2021/0341147 A1 | 11/2021 | Wada et al. |
| 2022/0290863 A1* | 9/2022 | Naik .............. F23R 3/12 |
| 2023/0266009 A1* | 8/2023 | Naik .............. F23R 3/286 60/737 |

FOREIGN PATENT DOCUMENTS

| | | | |
|---|---|---|---|
| JP | 5965606 B2 | 5/2012 | |
| JP | 2012112642 A | 6/2012 | |
| WO | 2011086336 A1 | 7/2011 | |

* cited by examiner

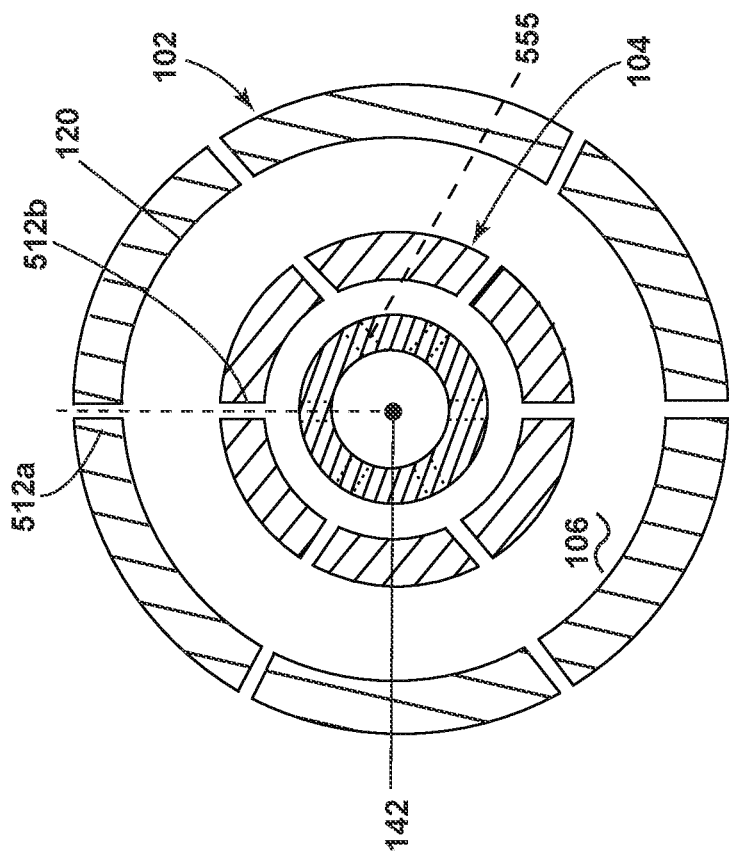
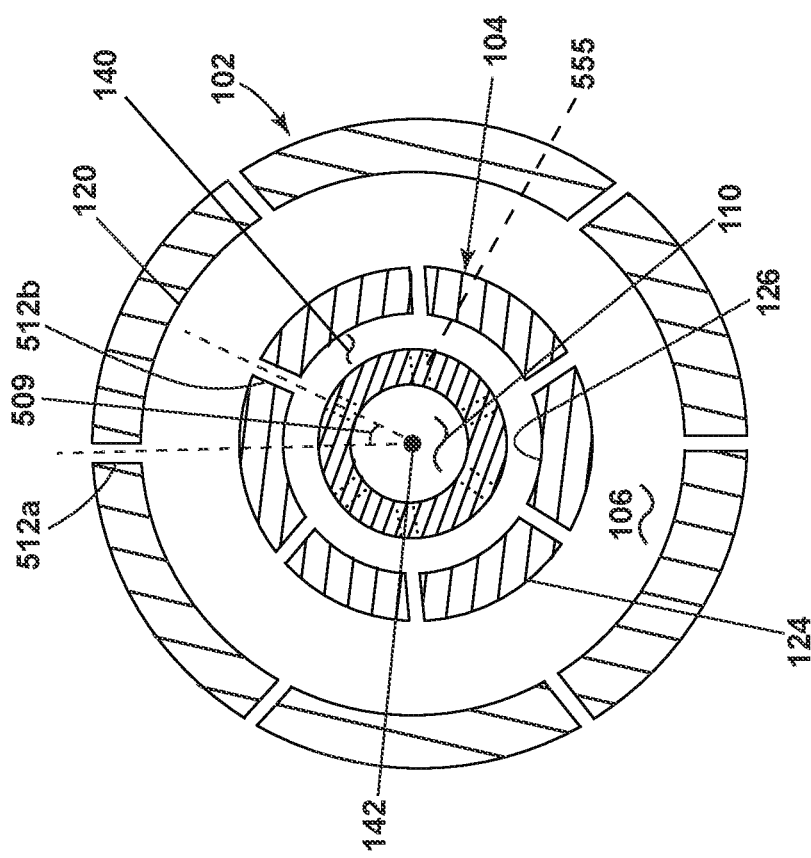
FIG. 10
FIG. 11

FUEL-AIR MIXING ASSEMBLY IN A TURBINE ENGINE

CROSS REFERENCE TO RELATED APPLICATIONS

This application claims priority to U.S. patent application Ser. No. 17/586,082, filed Jan. 27, 2022, currently allowed, which claims priority to and the benefit of U.S. Provisional Patent Application No. 63/294,573, filed on Dec. 29, 2021, both of which are incorporated herein by reference in their entirety.

TECHNICAL FIELD

The disclosure generally relates to a fuel-air mixing assembly of an engine, more specifically to a fuel-air mixing assembly fluidly coupled to a combustor of a turbine engine.

BACKGROUND

Turbine engines, and particularly gas or combustion turbine engines, are rotary engines that extract energy from a flow of combusted gases passing through the engine and flowing over a multitude of airfoils, including stationary vanes and rotating turbine blades.

Varieties of fuel for use in combustion turbine engines are being explored. Hydrogen or hydrogen mixed with another element or compound can be used for combustion, however hydrogen or a hydrogen mixed fuel can result in a higher flame temperature than traditional fuels. That is, hydrogen or a hydrogen mixed fuel typically has a wider flammable range and a faster burning velocity than traditional fuels such petroleum-based fuels, or petroleum and synthetic fuel blends. Therefore, the many of the combustion components designed for traditional fuels would not be suitable for hydrogen or hydrogen mixed fuels.

BRIEF DESCRIPTION OF THE DRAWINGS

A full and enabling disclosure, including the best mode thereof, directed to one of ordinary skill in the art, is set forth in the specification, which makes reference to the appended figures in which:

FIG. 10 is cross section from FIG. 9 taken along a fuel orifice centerline in accordance with an exemplary embodiment of the present disclosure.

FIG. 11 is a variation of the cross section of FIG. 10 in accordance with an exemplary embodiment of the present disclosure.

DETAILED DESCRIPTION

Figure 1:
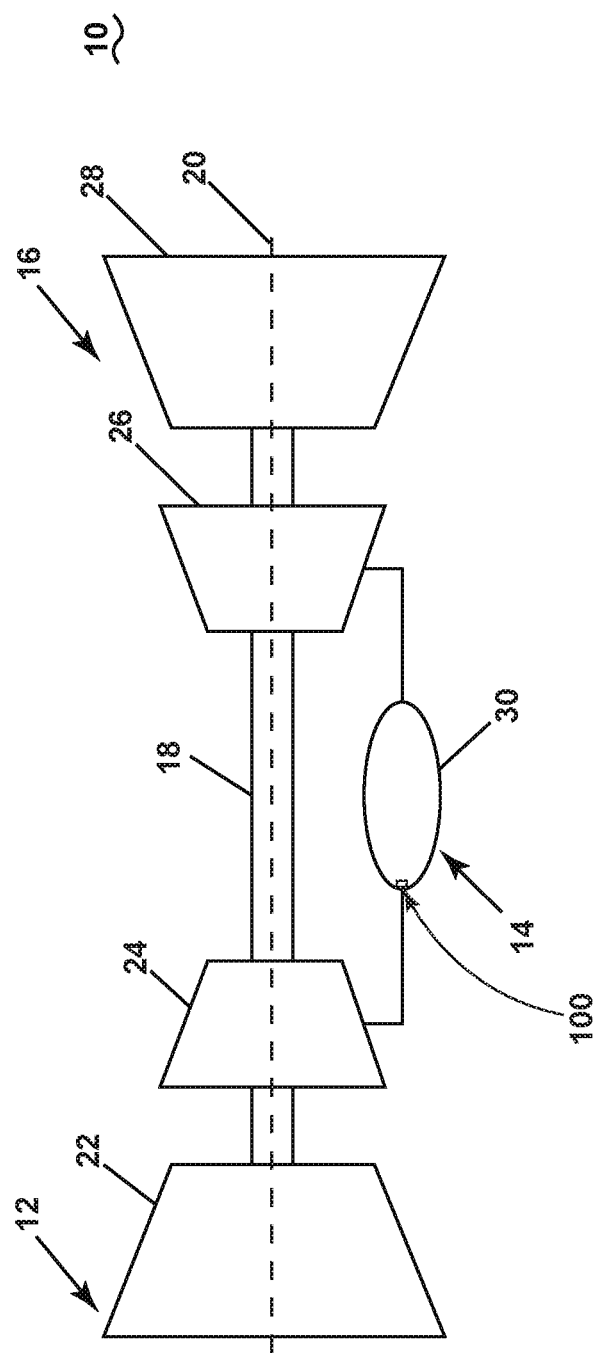
FIG. 1 is a schematic cross-sectional diagram of a turbine engine for an aircraft having a fuel-air mixing assembly in accordance with an exemplary embodiment of the present disclosure.

Aspects of the disclosure described herein are generally directed to a fuel-air mixing assembly for a turbine engine, where the fuel-air mixing assembly is fluidly coupled to or at least partially included within a combustor. The fuel-air mixing assembly is provided with a fuel containing hydrogen (hereinafter, hydrogen-containing fuel) that is mixed with at least one airflow within the fuel-air mixing assembly. Hydrogen-containing fuel typically has a wider flammable range and a faster burning velocity than traditional fuels such petroleum-based fuels or petroleum and synthetic fuel blends. The burn temperatures for hydrogen-containing fuel can be higher than the burn temperatures of traditional fuel, such that existing engine designs for traditional fuels would not be capable of operating under the heightened temperatures. The fuel-air mixing assembly, as described herein, provides a structure that is designed for the heightened temperatures of fuel such as hydrogen-containing fuel or any other fuel that burns hotter than traditional fuels. When compared to traditional fuel-air mixing assemblies, the fuel-air mixing assembly as disclosed herein includes fuel outlets that are farther downstream from air intakes. The fuel-air mixing assembly, as disclosed herein, can include at least a portion of an air passage (where the fuel and air mix) that has a constant area to maintain the velocity of the fuel-air mixture.

In addition to higher temperatures, hydrogen-containing fuel can produce nitrogen oxides (NOx). A typical method used to reduce NOx emissions is to inject a diluent (water, steam, nitrogen) into the combustor, but this may result in reduced performance of the turbine engine. The fuel-air mixing assembly, as described herein, provides a structure to reduce NOx emissions without the use of a diluent.

For purposes of illustration, the present disclosure will be described with respect to the turbine for an aircraft turbine engine. It will be understood, however, that aspects of the disclosure described herein are not so limited and may have general applicability within an engine, including compressors, power generation turbines, as well as in non-aircraft applications, such as other mobile applications and non-mobile industrial, commercial, and residential applications.

Reference will now be made in detail to the combustor architecture, and in particular the fuel nozzle and swirler for providing fuel to the combustor located within a turbine engine, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine 1 and aft refers to a position closer to an engine nozzle or exhaust.

The term "flame holding" relates to the condition of continuous combustion of a fuel such that a flame is maintained along or near to a component, and usually a portion of the fuel orifice assembly as described herein, and "flashback" relate to a retrogression of the combustion flame in the upstream direction.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The singular forms "a", "an", and "the" include plural references unless the context clearly dictates otherwise. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. The compressor section 12, the combustion section 14, or the turbine section 16 can be in an axial flow arrangement. The compressor section 12, the combustion section 14, or the turbine section 16 can define an axially extending engine centerline. A drive shaft 18 rotationally couples the compressor section 12 and turbine section 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26 and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel in a fuel-air mixing assembly 100 located in a combustor 30, and ignited, thereby generating combustion gases. Some work is extracted from these combustion gases by the HP turbine 26, which can drive at least the HP compressor 24. The combustion gases are discharged into the LP turbine 28, which can extract additional work to drive the LP compressor 22, and the exhaust gas is ultimately discharged from the turbine engine 10 via an exhaust section (not illustrated) downstream of the turbine section 16. The driving of the LP turbine 28 can drive the LP spool to rotate the fan (not illustrated) and/or the LP compressor 22. The pressurized airflow and the combustion gases can together define a working airflow that flows through the fan, the compressor section 12, the combustion section 14, and the turbine section 16 of the turbine engine 10.

Figure 2:
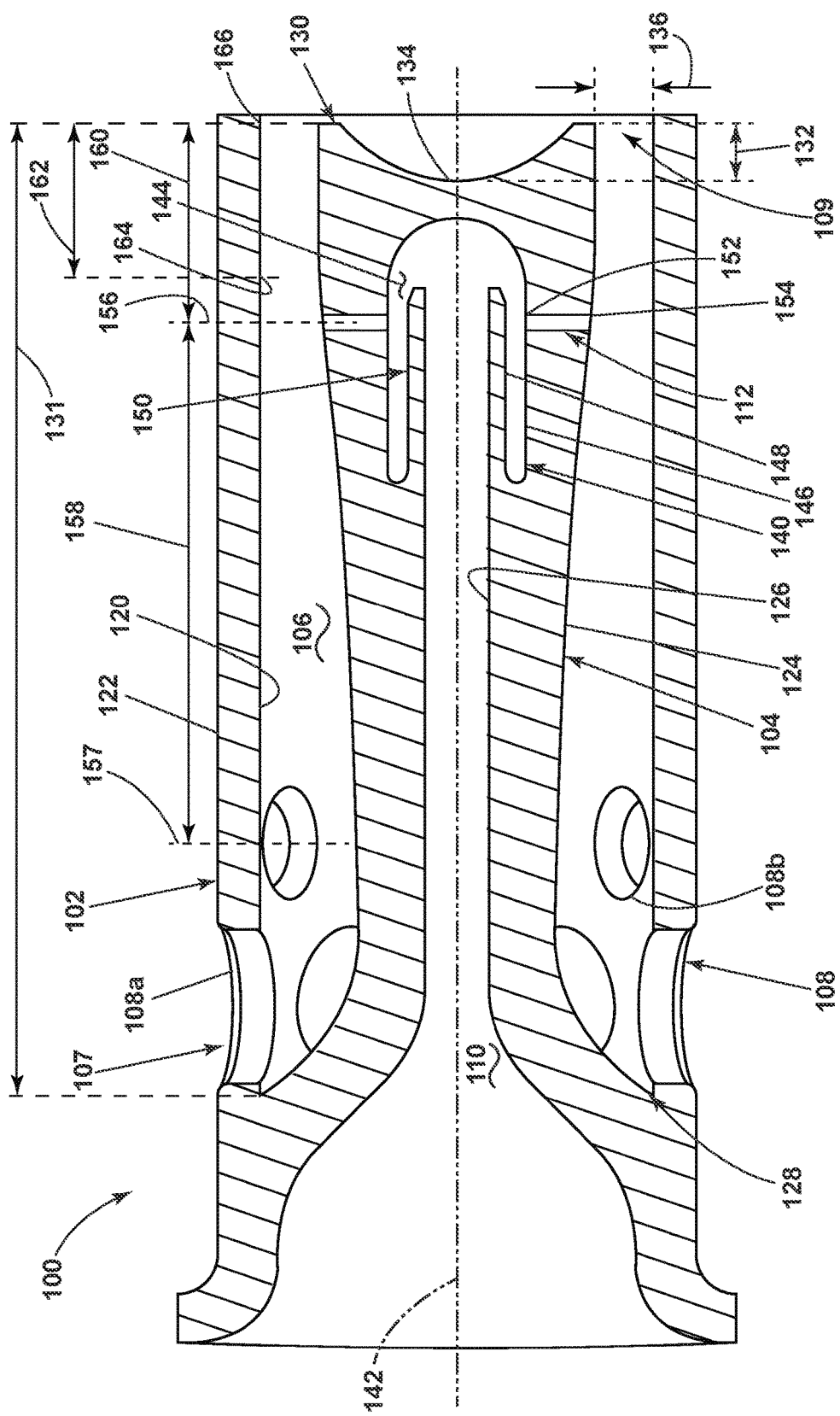
FIG. 2 is a cross section-view of a portion of a combustor section of the turbine engine, further illustrating the fuel-air mixing assembly of FIG. 1 in accordance with an exemplary embodiment of the present disclosure.

FIG. 2 is a cross section of the fuel-air mixing assembly 100, which can be utilized within the combustion section 14 of FIG. 1, for example. The fuel-air mixing assembly 100 can be part of a fuel nozzle located upstream and fluidly coupled to the combustion section 14 or the combustor 30. The fuel-air mixing assembly 100 includes at least an outer wall 102, a center body 104, an annular flow passage or air passage 106, a plurality of apertures 108, a fuel cavity 110, and a plurality of fuel orifices 112. While FIG. 2 is a schematic 2-D illustration, elements, for example, the outer wall 102, the center body 104, the air passage 106, and the fuel cavity 110, can be circumferential, circular, or annular about a center body axis or centerline a.

The outer wall 102 can be a combustor liner, shroud, or a mixing tube outer wall, in non-limiting examples. The outer wall 102 includes an outer wall inner surface 120 and an outer wall outer surface 122. An outer wall thickness can be defined as a distance between the outer wall inner surface 120 to the outer wall outer surface 122. The plurality of apertures 108 extend through the outer wall 102. That is, the plurality of apertures 108 extend from the outer wall inner surface 120 to the outer wall outer surface 122.

The center body 104 can be at least partially circumscribed by the outer wall 102. The center body 104 can have a center body outer surface 124 and a center body inner surface 126. The center body 104 can be at least partially hollow. The center body 104 can extend from the outer wall 102 at a fore end or first end 128 to a second end, an aft end, or an axial end 130. The axial end 130 of the center body 104 can be the farthest point or end of the center body 104 extending downstream. The axial end 130 can be an exit plane, at which point the fuel-air mixture would exit the portion of the air passage 106 partially defined by the center body 104. Alternatively, the axial end 130 can be the end of the center body 104 that is axially downstream of the first end 128, wherein the axial end 130 is circumscribed by the outer wall 102. A center body length 131 can be measured axially from the first end 128 to the axial end 130.

A recess distance 132 can be measured from the axial end 130 to a peak recess point 134. The recess distance 132 can be between or equal to 0.0 centimeters to 1.3 centimeters. Optionally, the recess distance 132 can be between or equal to 0.3 centimeters to 0.9 centimeters.

Additionally, or alternatively, the recess distance 132 can be between or including 0%-25% of the center body length 131 or 0% to 100% of a diameter of the center body 104 at the axial end 130. While illustrated as concave, the axial end 130 can have a shape that is concave, convex, planer, or any combination therein.

The air passage 106 can be at least partially defined by the outer wall 102 and the center body 104. An inlet 107 to the air passage 106 can be located at or adjacent the first end 128 of the center body 104. An outlet 109 of the air passage 106 can be located at or adjacent the axial end 130 of the center body 104. More specifically, the air passage 106 can be defined by the outer wall inner surface 120 and the center body outer surface 124 or the space between the outer wall inner surface 120 and the center body outer surface 124. An air passage area can be defined as the area of a cross section of the air passage 106. The air passage area can be proportional to an air passage diameter 136, wherein the air passage diameter 136 is a distance measure from the outer wall inner surface 120 to the center body outer surface 124. Optionally, the air passage area of the air passage 106 increases as the air passage diameter 136 increases, decreases as the air passage diameter 136 decreases, and remains constant when the air passage diameter 136 remains constant.

The plurality of apertures 108 can extend through the outer wall 102 and fluidly couple the compressor section 12 (FIG. 1) to the air passage 106. That is, an airflow of compressed air from the HP compressor 24 (FIG. 1) enters the air passage 106 via the plurality of apertures 108. A first set of apertures 108a and a second set of apertures 108b can be defined by the plurality of apertures 108. The first set of apertures 108a can be circumferentially spaced and generally located at a first axial position. The second set of apertures 108b can be circumferentially spaced apertures and generally located at a second axial position, downstream of the first axial position relative to an airflow through the air passage 106. That is, the centerline of each aperture of the first set of apertures 108a is upstream of a centerline for each aperture of the second set of apertures 108b.

The fuel cavity 110 is defined, at least in part, by the center body 104. That is, the center body inner surface 126 can define the fuel cavity 110. In other words, the hollow portion of the center body 104 is the fuel cavity 110. It is contemplated that the fuel cavity 110 can be a hydrogen fuel cavity where the hydrogen fuel cavity can provide hydrogen-containing fuel to at least one fuel orifice.

The fuel cavity 110 can include at least one channel 140 (herein "channel"), which is defined within the center body 104, radially exterior of the center body inner surface 126. The channel 140 is fluidly coupled to the fuel cavity 110 and can extend in an aft-to-fore direction. A channel outer surface 146 and a channel inner surface 148 can define the channel 140. The channel 140 can receive fuel from the fuel cavity 110 at an inlet 144. The channel 140 can have one or more portions that extend towards the center body outer surface 124. Additionally, or alternatively, the channel 140 can include one or more portions that extend parallel to the center body outer surface 124 or the center body inner surface 126. It is contemplated that the channel 140 can have one or more changes in direction relative to the centerline 142 of the fuel cavity 110. It is contemplated that the diameter of the channel 140 can remain constant or include one or more portions in which the diameter is changing. The channel 140 can extend an axial distance between 0% to 75% of the center body length 131, however it is contemplated that the channel 140 can extend an axial distance between 2% to 50% of the center body length 131.

A protrusion 150 can be defined by the channel inner surface 148 and the center body inner surface 126. The protrusion 150 can have a uniform thickness. Alternatively, the protrusion 150 can have one or more portions in which the thickness changes, continuously or discretely.

The plurality of fuel orifices 112 fluidly couple the fuel cavity 110 to the air passage 106, and more specifically, the fuel orifices 112 couple the channel 140 to the air passage 106. The plurality of fuel orifices 112 can be circumferentially spaced about the center body 104. A fuel inlet 152 can be located at the channel outer surface 146 to receive fuel from the channel 140. A fuel outlet 154 can be located at the center body outer surface 124 to provide fuel to the air passage 106. That is, the fuel outlet 154 opens at the center body outer surface 124 to provide fuel to the air passage 106. It is contemplated that the injection diameter of the plurality of fuel orifices 112 can be constant, as illustrated, or change in one or more portions as the plurality of fuel orifices 112 extend radially outward from the fuel cavity 110 to the air passage 106. It is further contemplated that the injection diameter can vary between two or more fuel orifices of the plurality of fuel orifices 112.

The plurality of fuel orifices 112 can be located at a third axial position, downstream of the second axial position. That is, a fuel orifice centerline 156 of the fuel outlet 154 can be located at least 0.5 centimeters from the second set of apertures 108b or an aperture centerline 157 of the second set of apertures 108b. In other words, an aperture to orifice distance 158 can be equal to or more than 0.5 centimeters. Additionally, or alternatively, the orifice distance 158 can be between or equal to 10%-95% of the center body length 131.

A predetermined distance or fuel orifice distance 160 can be measured from the fuel orifice centerline 156 to the axial end 130. The fuel orifice distance 160 can be between or equal to 0.0 centimeters and 2.0 centimeters. It is contemplated that the fuel orifice distance 160 can be between or equal to 0%-50% of the center body length 131. Additionally, or alternatively, the fuel orifice distance 160 can be between or equal to 0% to 100% of the diameter of the center body 104 at the axial end 130.

A constant cross-sectional area portion or constant area portion 162 of the air passage 106 can be located between the plurality of fuel orifices 112 and the axial end 130. That is, the air passage diameter 136 is constant between at least a first point 164 downstream of the plurality of fuel orifices 112 and a second point 166 downstream of the first point 164, wherein the second point 166 is at the axial end 130, as illustrated, or upstream of the axial end 130. Stated another way, the constant area portion 162 has a constant cross-sectional area along a predetermined portion of the center body 104, starting at the first point 164 and terminating at the axial end 130. It is contemplated that the fuel outlet 154 opens at or opens into the constant area portion 162.

Figures 3A, 3B, 3C, 3D, 3E:
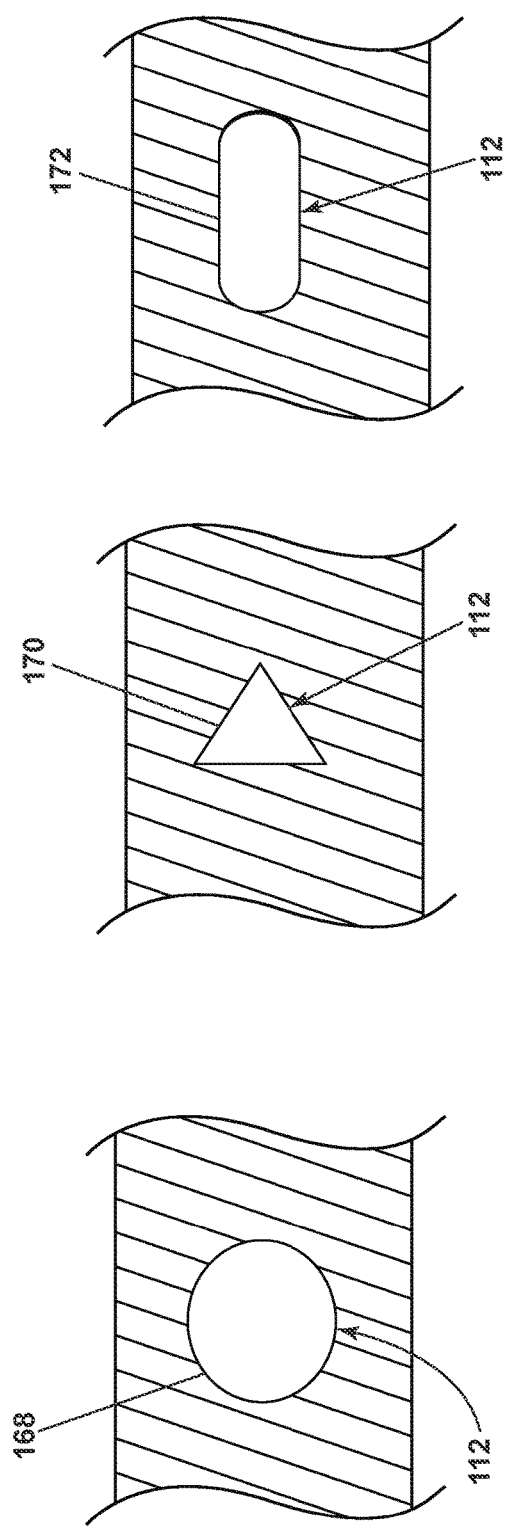
FIG. 3A is a cross section of at least one fuel orifice of the fuel-air mixing assembly of FIG. 2 in accordance with an exemplary embodiment of the present disclosure.
FIG. 3B is a variation of the cross section of FIG. 3A in accordance with an exemplary embodiment of the present disclosure.
FIG. 3C is another variation of the cross section of FIG. 3A in accordance with an exemplary embodiment of the present disclosure.
FIG. 3D is yet another variation of the cross section of FIG. 3A in accordance with an exemplary embodiment of the present disclosure.
FIG. 3E is still yet another variation of the cross section of FIG. 3A in accordance with an exemplary embodiment of the present disclosure.

FIG. 3A illustrates a circular cross section 168 of at least one fuel orifice of the plurality of fuel orifices 112. As illustrated, by way of example, one or more cross sections of the least one fuel orifice of the plurality of fuel orifices 112 can have a circular shape, wherein the circle is a perfect circle or include radius measurements within 5% of each other.

FIG. 3B illustrates a variation of the cross section of FIG. 3A, specifically a triangular cross section 170, of at least one fuel orifice of the plurality of fuel orifices 112. As illustrated, by way of example, one or more cross sections of the least one fuel orifice of the plurality of fuel orifices 112 can have a triangular shape. The triangular shape can be any triangle, including, but not limited to an acute triangle, a right triangle, or an obtuse triangle. Optionally, one or more legs or angles of the triangle can be equal or have measurements within 5% of each other.

FIG. 3C illustrates another variation of the cross section of FIG. 3A, specifically a stadium cross section 172, of at least one fuel orifice of the plurality of fuel orifices 112. As illustrated, by way of example, one or more cross sections of the least one fuel orifice of the plurality of fuel orifices 112 can have a stadium shape. The stadium shape can also be a racetrack shape, a rounded rectangle, or any rectangle with chamfered corners.

FIG. 3D illustrates yet another variation of the cross section of FIG. 3A, specifically a teardrop cross section 174, of at least one fuel orifice of the plurality of fuel orifices 112. As illustrated, by way of example, one or more cross sections of the least one fuel orifice of the plurality of fuel orifices 112 can have a teardrop shape. The teardrop shape, or lachrymiform, can have a rounded smaller portion and a rounded larger portion, as illustrated, or include a smaller pointed portion and a larger rounded portion.

FIG. 3E illustrates still yet another variation of the cross section of FIG. 3A, specifically an elliptical section 176, of at least one fuel orifice of the plurality of fuel orifices 112. As illustrated, by way of example, one or more cross sections of the least one fuel orifice of the plurality of fuel orifices 112 can have an elliptical shape. The elliptical shape can be an ellipse, as illustrated or sub elliptical, pyriform, oval, or any combination therein.

It is contemplated that one or more fuel orifices of the plurality of fuel orifices 112 can include one or more of the cross section shapes as illustrated in FIGS. 3A-3E.

Referring again to FIG. 1 and FIG. 2, in operation, an airflow from the HP compressor 24 flows through the plurality of apertures 108 into the air passage 106. A steady airflow is developed in the air passage 106. Once the steady airflow is established, fuel, for example hydrogen-containing fuel, from the fuel cavity 110 flows into the channel 140 via the inlet 144. Fuel in the channel 140 then flows into the plurality of fuel orifices 112 via the fuel inlet 152. At the fuel outlet 154 fuel is introduced or injected to the airflow in the air passage 106. The fuel is introduced to the airflow in the air passage 106 in a low turbulent region, which helps to reduce flame holding. The plurality of fuel orifices 112 are spread circumferentially to provide uniform fuel spread, resulting in better mixing and at the same time achieving fuel penetration into the airflow such that the fuel-air mixture stays away from the outer wall 102 or the center body 104.

The plurality of fuel orifices 112 are located 2.0 centimeters or less from the aft end of the center body 104. The location of the plurality of fuel orifices 112 helps to reduce flame holding at the center body 104 or the air passage 106.

The air passage 106 includes the constant area portion 162 that helps to maintain high velocity of the air-fuel mixture. That is, the constant area portion 162 can maintain a high velocity of the air-fuel mixture over a longer length than existing designs for fuel-air mixing. The high velocity of the air-fuel mixture reduces flash back into the air passage 106, allowing the turbine engine 10 to utilize hydrogen-containing fuel or any other fuel that burns hotter than traditional fuels.

The air-fuel mixture is combusted downstream of the center body 104. Due to uniform mixing of the fuel with the air, upon combustion, the temperature distribution in the combustion section 14 or the combustor 30 is more uniform, permitting the use of higher-temperature fuels, such as hydrogen, which provides for reducing or eliminating emissions, while maintaining or improving engine efficiency.

Figure 4:
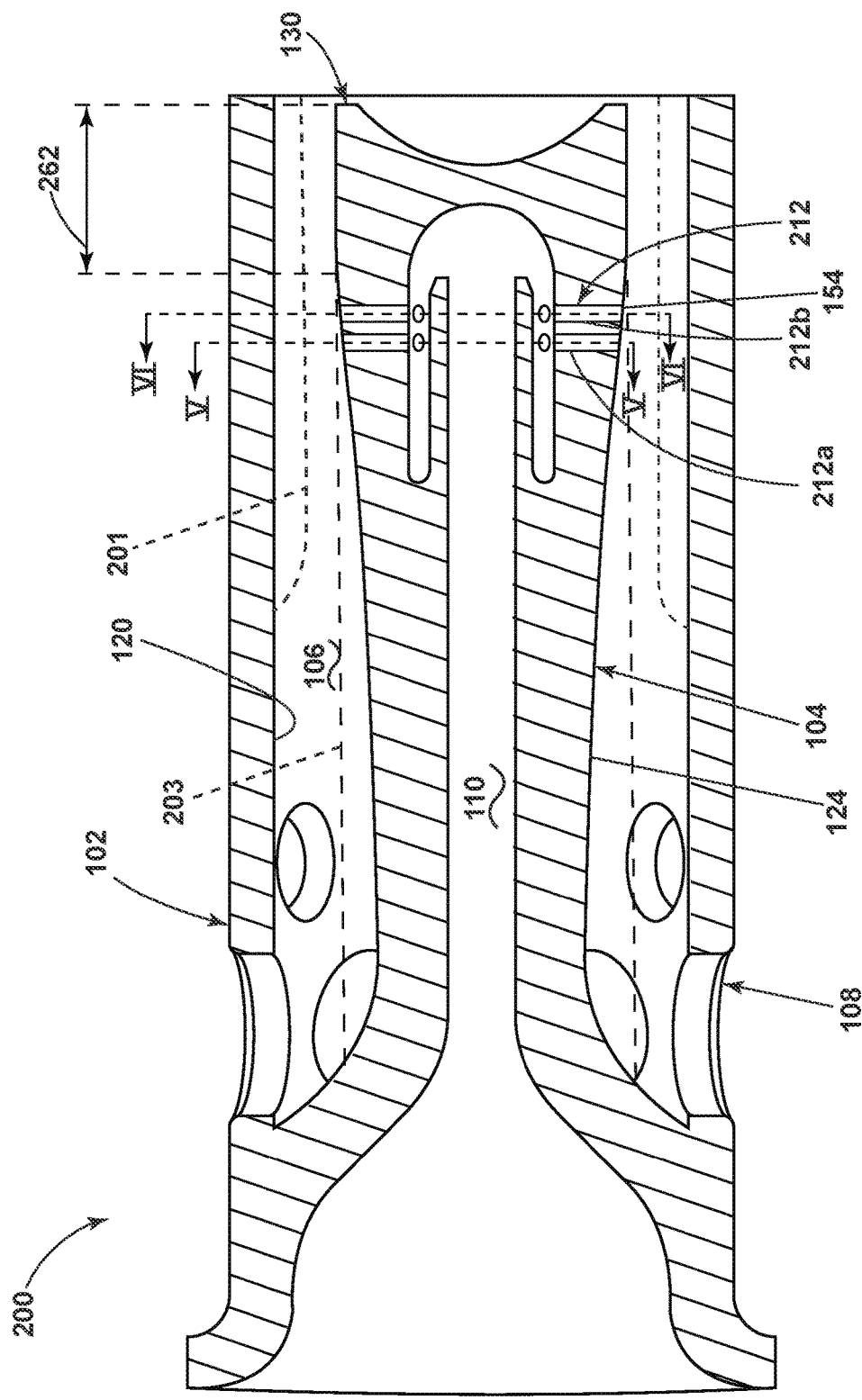
FIG. 4 is a variation of the cross section of FIG. 2 in accordance with an exemplary embodiment of the present disclosure.

FIG. 4 illustrates a cross section of another exemplary fuel-air mixing assembly 200. The fuel-air mixing assembly 200 is similar to the fuel-air mixing assembly 100 of FIG. 2, therefore, like parts will be identified with like numerals increased by 100, with it being understood that the description of the like parts of the fuel-air mixing assembly 100 applies to the fuel-air mixing assembly 200, unless otherwise noted. The fuel-air mixing assembly 200 includes at least the outer wall 102, the center body 104, the air passage 106, the plurality of apertures 108, the fuel cavity 110, and a plurality of fuel orifices 212.

The plurality of fuel orifices 212 can include a first set of fuel orifices 212a and a second set of fuel orifices 212b. The first set of fuel orifices 212a can be axially spaced from the second set of fuel orifices 212b. That is, the first set of fuel orifices 212a and the second set of fuel orifices 212b can be staggered axially to achieve better fuel spread and intermixing with the air supply. It is further contemplated that each of the fuel orifices within the first set of fuel orifices 212a or the second set of fuel orifices 212b can also vary in axial location in relationship to fuel orifices from the same set.

The first set of fuel orifices 212a and the second set of fuel orifices 212b can be an axial distance between 0.0 centimeters and 2.0 centimeters from the axial end 130. A first outlet 254a (see FIG. 5) of the first set of fuel orifices 212a can be radially offset from at least one second outlet 254b (see FIG. 6) of the second set of fuel orifices 212b. It is contemplated that the distance between the first set of fuel orifices 212a and the second set of fuel orifices 212b can be 0-30% of the diameter of the center body 104 at the axial end 130.

The axial staggering of the first set of fuel orifices 212a and the second set of fuel orifices 212b can further improve the distribution of fuel to the airflow in the air passage 106, and can improve mixing of the fuel and air supplies prior to a constant area portion 262.

Optionally, the outer wall inner surface 120 can include one or more bumps, projections, or protrusions, illustrated, by way of example, by a reduction portion 201. The reduction portion 201 can be unitarily formed with the outer wall 102. Alternatively, the reduction portion 201 can be material coupled to the outer wall inner surface 120. The reduction portion 201 can include a reducing cross-sectional area portion or converging portion upstream of the plurality of fuel orifices 212. Downstream of the plurality of fuel orifices 212, the reduction portion 201 can maintain the constant area portion 262, although at a smaller air passage diameter and air passage area than without the reduction portion 201. The reduction portion 201 can increase airflow speed at the converging portion upstream of the fuel injection and maintain that speed through the constant area portion 262 downstream of the plurality of fuel orifices 212. These higher, maintained velocities over a longer axial length for the fuel-air mixture can prevent flash back.

It is contemplated that the reduction portion 201 can include a converging, sloped, or angled portion that extends axially to within a distance of the fuel outlet 154 that is 10% or less of the diameter of the center body 104 at the axial end 130. Downstream of the fuel outlet 154, the reduction portion 201 can have a cylindrical or constant nominal diameter portion. Alternatively, the angled portion can extend axially to or beyond the fuel outlet 154 or axial end 130.

It is contemplated that the center body 104, as illustrated, can have an increasing diameter portion, such that the center body outer surface 124 narrows or reduces the diameter of the air passage 106.

Alternatively, it is further contemplated that the center body 104 can optionally include a cylindrical section 203, or constant diameter portion. The constant diameter portion of the center body 104 can axially overlap the converging portion or the constant nominal diameter portion of the reduction portion 201. It is also contemplated that the fuel outlet 154 can be located in the constant diameter portion of the center body 104. That is, the constant diameter portion of the center body 104 can extend upstream and/or downstream of the fuel outlet 154. Additionally, or alternatively the constant diameter portion of the center body 104 can extend between 10%-100% of the center body length.

It is further contemplated that the increasing diameter portion of the center body 104 can extend to the axial end 130. That is, it is contemplated that the increasing diameter portion of the center body 104 can be 5%-100% of the center body length.

Figure 5:
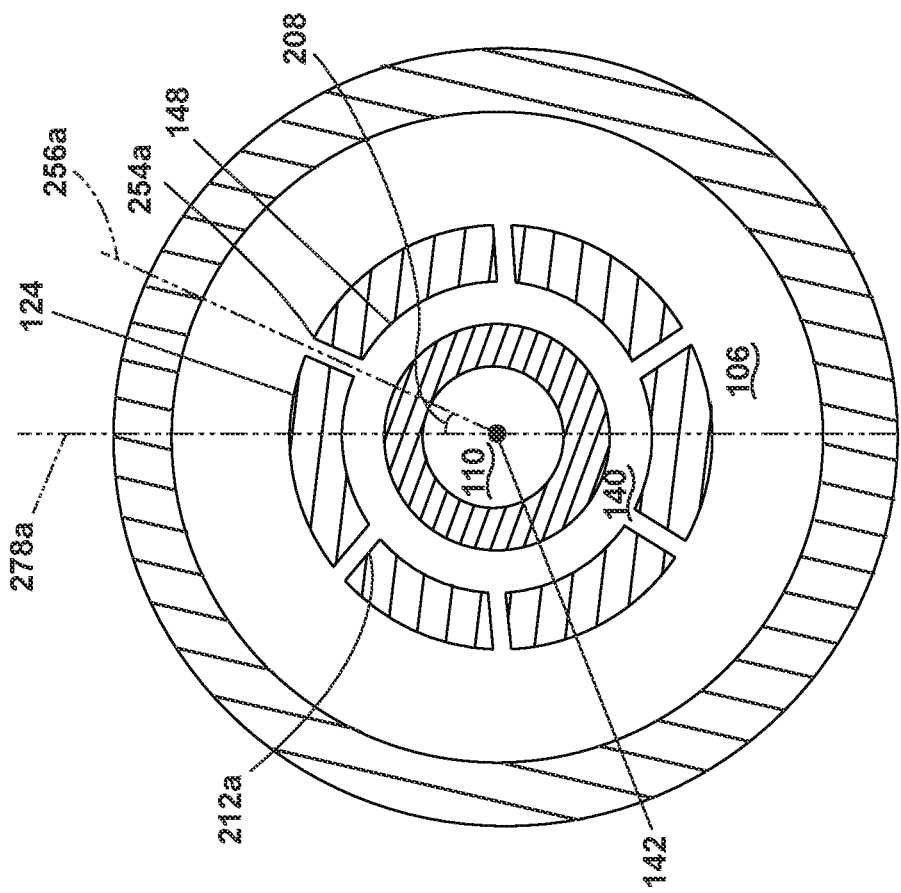
FIG. 5 is cross section from FIG. 4, further illustrating a first set of orifices in accordance with an exemplary embodiment of the present disclosure.

FIG. 5 is cross section taken along line V-V of FIG. 4 further illustrating the first set of fuel orifices 212a. The first set of fuel orifices 212a extend from the channel inner surface 148 to the center body outer surface 124. That is, the first set of fuel orifices 212a fluidly couple the channel 140 with the air passage 106. A first angle 208 can be defined as the angle between a fuel orifice centerline 256a and a vertical reference line 278a. The vertical reference line 278a is perpendicular to the centerline 142 of the fuel cavity 110. As illustrated, the first angle 208 can be a non-zero angle, however any angle, including zero is contemplated.

Figure 6:
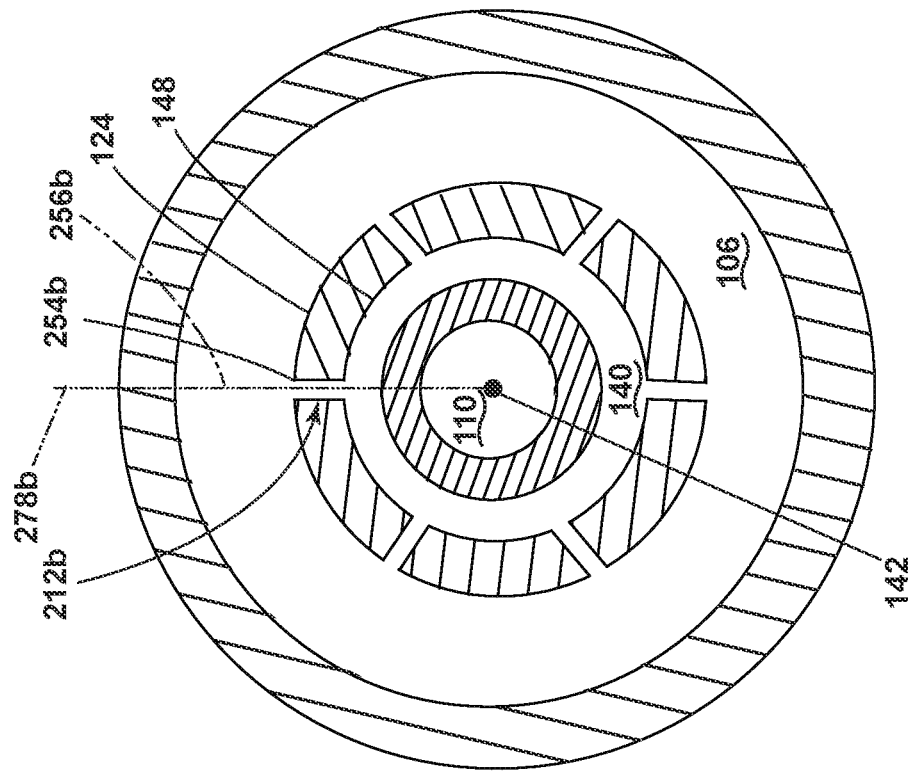
FIG. 6 is cross section from FIG. 4, further illustrating a second set of orifices in accordance with an exemplary embodiment of the present disclosure.

FIG. 6 is cross section taken along line VI-VI of FIG. 4 further illustrating the second set of fuel orifices 212b. The second set of fuel orifices 212b extend from the channel inner surface 148 to the center body outer surface 124. That is, the second set of fuel orifices 212b fluidly couple the channel 140 with the air passage 106. A second angle can be defined as the angle between a fuel orifice centerline 256b and a vertical reference line 278b. The vertical reference line 278b is perpendicular to the centerline 142 of the fuel cavity 110 and in the same plane as the vertical reference line 278b. As illustrated, the second angle can be zero, as the fuel orifice centerline 256b is aligned with the vertical reference line 278b, such that they are shown as overlapping, however any non-zero angle is also contemplated.

FIG. 5 and FIG. 6 illustrate, by way of example, a situation which the first outlet 254a of the first set of fuel orifices 212a is circumferentially offset from the second outlet 254b of the second set of fuel orifices 212b. Such an offset can improve uniform fuel distribution and mixing of the fuel and air.

Figure 7:
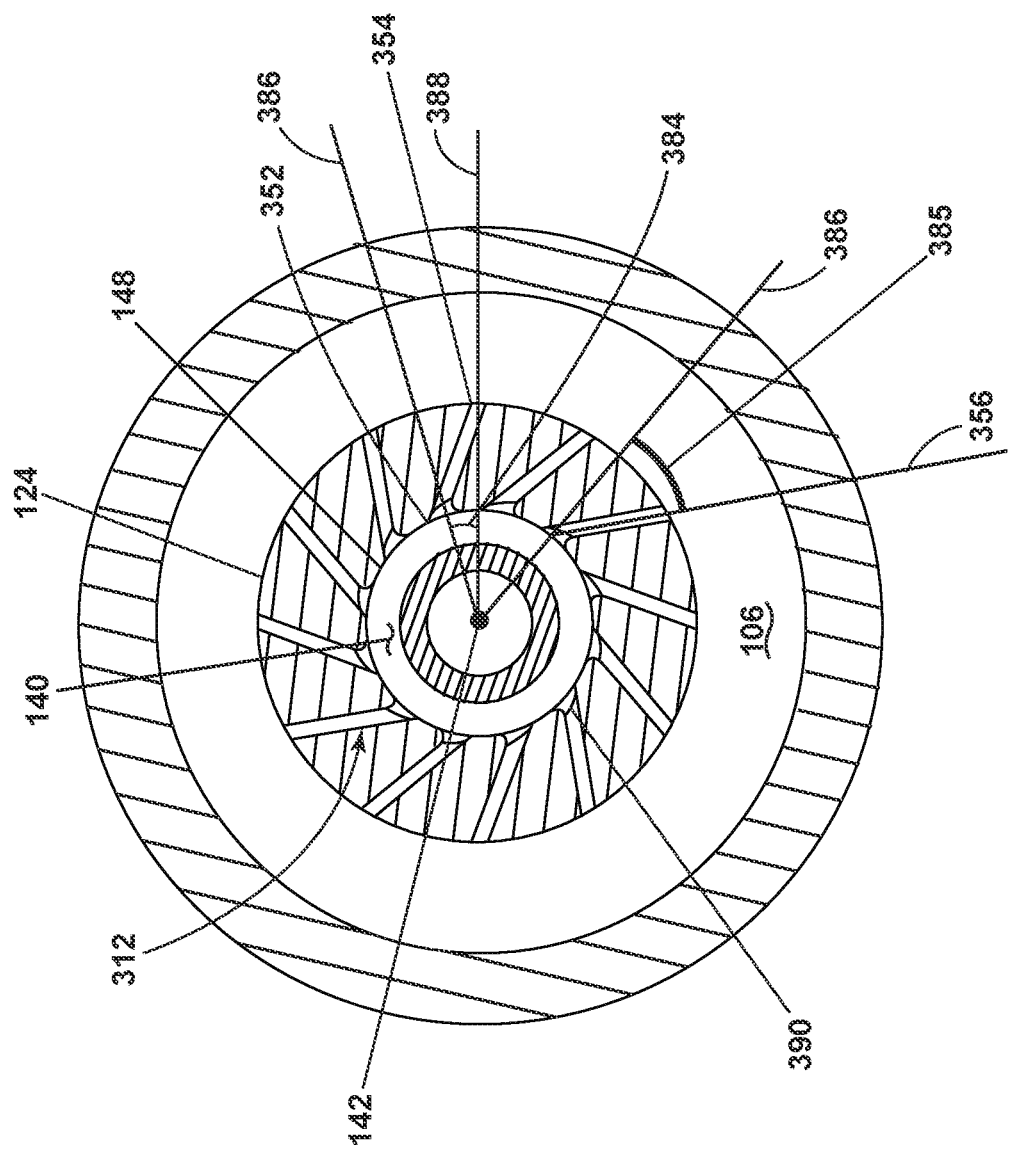
FIG. 7 is a variation of the cross section of FIG. 4 or FIG. 5 in accordance with an exemplary embodiment of the present disclosure.

FIG. 7 is an alternate cross section for a plurality of fuel orifices 312. The plurality of fuel orifices 312 are similar to the plurality of fuel orifices 212, 212a, 212b, therefore, like parts will be identified with like numerals increased by 100, with it being understood that the description of the like parts of the plurality of fuel orifices 212, 212a, 212b applies to the plurality of fuel orifices 312.

The plurality of fuel orifices 312 extend from the channel inner surface 148 to the center body outer surface 124. That is, the plurality of fuel orifices 312 fluidly couple the channel 140 with the air passage 106. An orifice angle 384 can be defined as the angle between a first radius 386 extending from the centerline 142 through an inlet 352 and a second radius 388 extending from the centerline 142 through an outlet 354. As illustrated, the orifice angle can be non-zero. In one example, the orifice angle 384 can be between or equal to −60 degrees to 60 degrees, that is 60 degrees counterclockwise to 60 degrees clockwise. It is further contemplated that the orifice angle 384 can be between 0-30 degrees, although any angle value, including zero, is also contemplated.

It is contemplated that the plurality of fuel orifices 312 can include at least one diverter 390. The at least one diverter 390 can change the direction of the flow, limit the volume of the flow, increase or decrease the speed of the flow, or change the direction of the flow, or even increase or decrease local turbulence. Additionally, one or more valves (not show) can be included in one or more of the plurality of fuel orifices 312.

An orifice centerline angle 385 can be measured from the first radius and extending from the centerline 142 through the inlet 352 and a fuel orifice centerline 356. The orifice centerline angle 385 can be, for example, between or equal to −60 degrees to 60 degrees. That is, the orifice centerline angle 385 can be 60 degrees counterclockwise to 60 degrees clockwise. It is further contemplated that the orifice centerline angle 385 can be between 0-30 degrees, although any angle value, including zero, is also contemplated.

Figure 8:
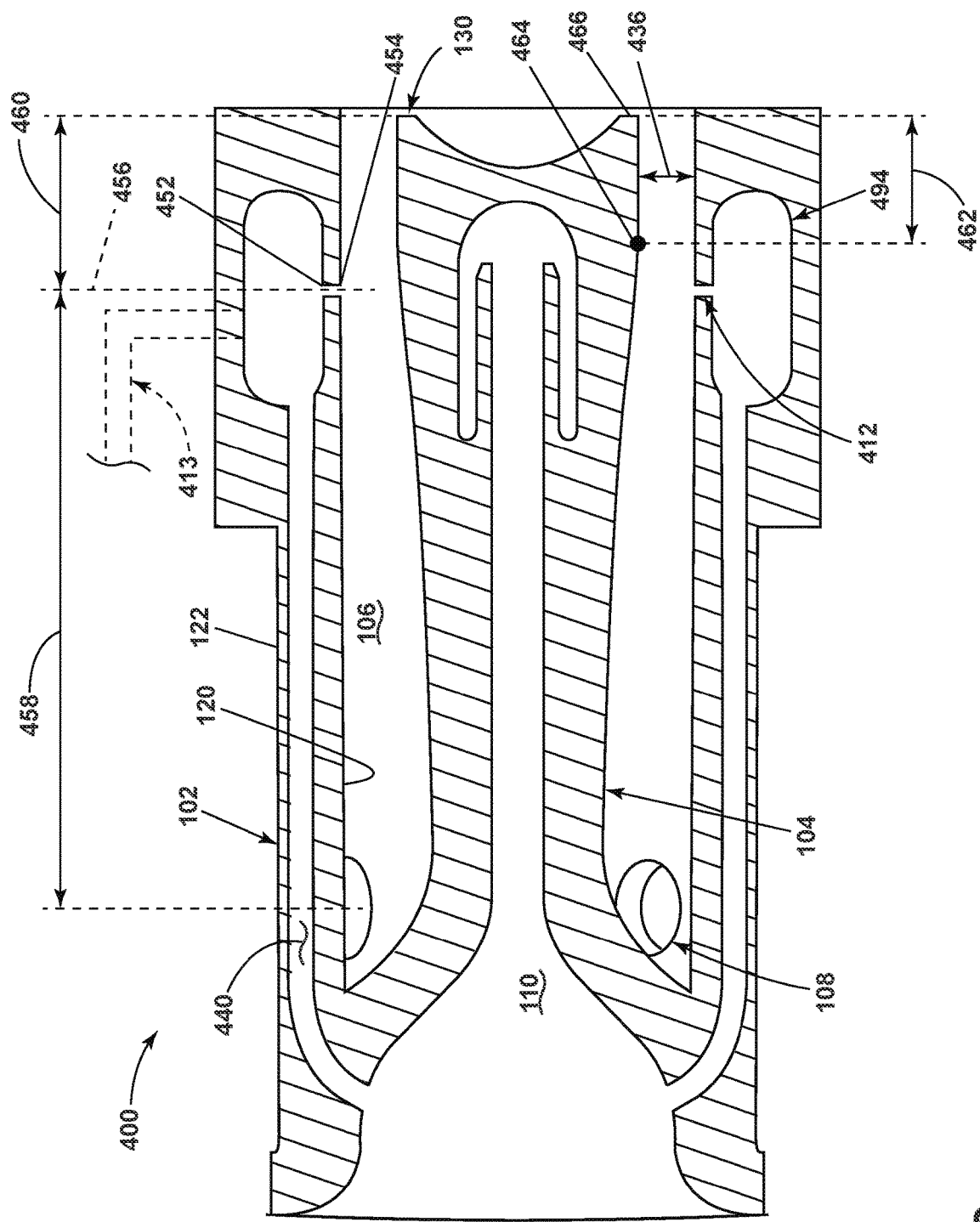
FIG. 8 is another variation of the cross section of FIG. 2 in accordance with an exemplary embodiment of the present disclosure.

FIG. 8 illustrates a cross section of a portion of the combustion section 14 (FIG. 1) further illustrating a fuel-air mixing assembly 400. The fuel-air mixing assembly 400 is similar to the fuel-air mixing assembly 100, 200, therefore, like parts will be identified with like numerals increased by 200, with it being understood that the description of the like parts of the fuel-air mixing assembly 100, 200 applies to the fuel-air mixing assembly 400, unless otherwise noted. The fuel-air mixing assembly 400 includes at least the outer wall 102, the center body 104, the air passage 106, the plurality of apertures 108, the fuel cavity 110, and a plurality of fuel orifices 412.

The outer wall 102 includes the outer wall inner surface 120 and the outer wall outer surface 122. The plurality of apertures 108 extend through the outer wall 102 from the outer wall inner surface 120 to the outer wall outer surface 122.

The center body 104 can be at least partially circumscribed by the outer wall 102, having the axial end 130 of the center body 104 as the farthest point or end of the center body 104 extending downstream within the outer wall 102. The fuel cavity 110 is defined, at least in part, by the center body 104.

At least one channel 440 (herein "channel") can extend from the fuel cavity 110 into the outer wall 102 upstream of the center body 104. The channel 440 can curve, bend, or otherwise include any shape that allows the channel 440 to be defined within the outer wall 102. That is, the channel 440 and the plurality of apertures 108 do not intersect. The channel 440 can have one or more portions that extend towards the outer wall outer surface 122. Additionally, or alternatively, the channel 440 can include one or more portions that extend parallel to the outer wall inner surface 120. The channel 440 can fluidly couple the fuel cavity 110 to another fuel cavity illustrated as at least one fuel tank 494. The fuel tank 494 is illustrated as defined by the outer wall 102, however, it is contemplated that the fuel tank 494 can be coupled to the outer wall 102.

The plurality of fuel orifices 412 fluidly couple the fuel cavity 110 to the air passage 106. As illustrated, by way of example, the plurality of fuel orifices 412 fluidly couple the fuel tank 494 to the air passage 106. The plurality of fuel orifices 412 can be circumferentially spaced about the center body 104. A fuel inlet 452 receives fuel into at least one fuel orifice of the plurality of fuel orifices 412 from the fuel cavity 110 via the channel 440 and the fuel tank 494.

A fuel outlet 454 can be located at the outer wall inner surface 120 to provide fuel to the air passage 106. It is contemplated that the injection diameter of the plurality of fuel orifices 412 can be constant, as illustrated, or change in one or more portions of the fuel orifice as the plurality of fuel orifices 412 extend radially outward. It is further contemplated that the injection diameter can vary between two or more fuel orifices of the plurality of fuel orifices 412.

It is contemplated that the channel 440 or the fuel tank 494 can be a hydrogen channel or hydrogen fuel tank where the hydrogen channel or the hydrogen fuel tank can provide hydrogen-containing fuel to at least one fuel orifice.

In addition to or in place of the channel 440, an outside fuel source 413 can be coupled to the fuel tank 494. The outside fuel source 413 can include any number or combination of additional tanks, pump, conduits, or valves. It is contemplated that the outside fuel source 413 can be a hydrogen outside fuel source where the hydrogen outside fuel source can provide hydrogen-containing fuel to at least one fuel orifice.

The plurality of fuel orifices 412 can be located downstream of the plurality of apertures 108. That is, a fuel orifice centerline 456 of the fuel outlet 454 can be located at least 0.5 centimeters from the plurality of apertures 108. In other words, an aperture to orifice distance 458 can be equal to or more than 0.5 centimeters. Additionally, or alternatively, the aperture to orifice distance 458 can be between or equal to 10%-95% of a center body length.

A fuel orifice distance 460 can be measured from the fuel orifice centerline 456 to the axial end 130. The fuel orifice distance 460 can be between or equal to 0.0 centimeters and 2.0 centimeters. It is contemplated that the fuel orifice distance 460 can be between or equal to 0%-50% of the center body length. It is also contemplated that the fuel orifice distance 460 can be between or equal to 0%-100% of the diameter of the center body 104 measured at the axial end 130.

A constant area portion 462 of the air passage 106 can be located between the plurality of fuel orifices 412 and the axial end 130. That is, the air passage diameter 436 is constant between at least a first point 464 downstream of the plurality of fuel orifices 112 and a second point 466 downstream of the first point 464, wherein the second point 466 is at the axial end 130, as illustrated, or upstream of the axial end 130.

The constant area portion 462 provides for imparting a high velocity component to the mixture of air and gas emitted from the fuel orifice assembly, while the channel 440 provides for injecting fuel radially inward, as opposed to radially outward as shown FIGS. 2 and 4. A radially inward injection can provide for improved fuel and air mixing prior to the constant area portion 462.

Figure 9:
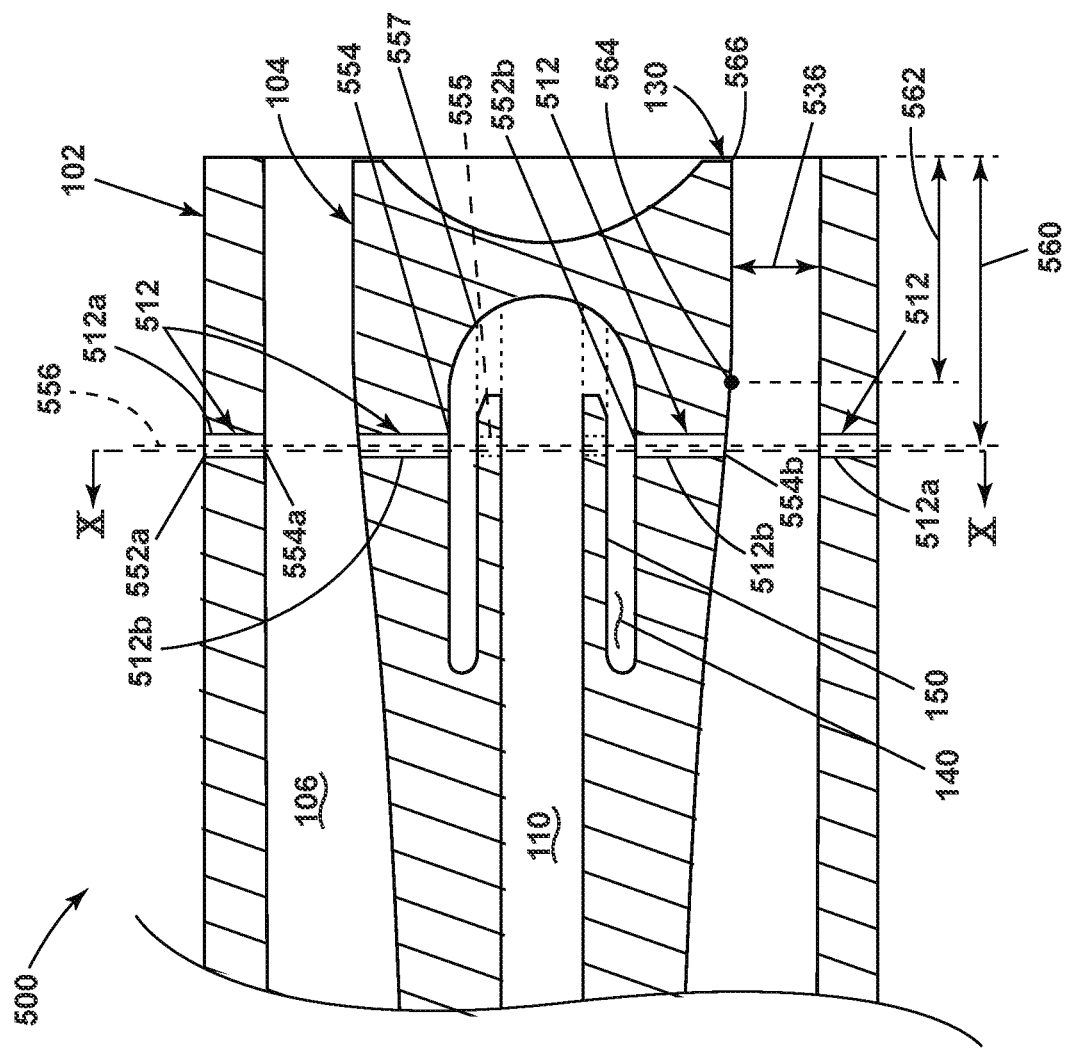
FIG. 9 is yet another variation of the cross section of FIG. 2 in accordance with an exemplary embodiment of the present disclosure.

FIG. 9 illustrates a cross section of a portion of the combustion section 14 (FIG. 1) further illustrating a fuel-air mixing assembly 500. The fuel-air mixing assembly 500 is similar to the fuel-air mixing assembly 100, 200, 400 therefore, like parts will be identified with like numerals increased by 100 with it being understood that the description of the like parts of the fuel-air mixing assembly 100, 200, 400 applies to the fuel-air mixing assembly 500, unless otherwise noted. The fuel-air mixing assembly 500 includes at least the outer wall 102 with the plurality of apertures (not shown), the center body 104, the air passage 106, the fuel cavity 110, and a plurality of fuel orifices 512.

The plurality of fuel orifices 512 include a first set of fuel orifices 512a and a second set of fuel orifices 512b. The first set of fuel orifices 512a pass through at least a portion of the outer wall 102. The first set of fuel orifices 512a fluidly couple the air passage 106 with a fuel tank (not shown) or other fuel source to provide fuel to the air passage 106. An inlet 552a can be fluidly coupled to an outlet 554a via the first set of fuel orifices 512a.

The second set of fuel orifices 512b pass through a portion of the center body 104. That is, the second set of fuel orifices 512b can be radially spaced from the first set of fuel orifices 512a. The second set of fuel orifices 512b fluidly couple the channel 140 with the air passage 106 to provide fuel to the air passage 106, wherein the channel 140 is fluidly coupled to the fuel cavity 110. An inlet 552b can be fluidly coupled to an outlet 554b via the second set of fuel orifices 512b.

The plurality of fuel orifices 512 can be located in different axial positions. That is, the first set of fuel orifices 512a can be at a different axial location that the second set of fuel orifices 512b. Additionally or alternatively, the orifices within the first or second set of fuel orifices 512a, 512b can be located at a variety of axial location, wherein the axial location is not uniform through each set.

Optionally, protrusion passages 555 can fluidly couple the channel 140 with the fuel cavity 110. The protrusion passages 555 can have similar characteristics to the plurality of fuel orifices 512. That is, the protrusion passages 555 can be circumferentially spaced, angled axially, or angled circumferentially. Further, the protrusion passages 555 can have any shape, including a changing shape cross section.

While illustrated as axially aligned with the second set of fuel orifices 512b, it is contemplated that the protrusion passages 555 can be at any axial location in alignment with, upstream, or downstream of the first set of fuel orifices 512a or the second set of fuel orifices 512b. Additionally or alternatively, the protrusion passages 555 can be located at a variety of axial locations with respect to other protrusion passages 555. That is, the axial location does not have to be uniform for all protrusion passages 555. Optionally, the protrusion 150 can extend to a downstream end portion 557 of the fuel cavity 110. In this example, the protrusion passages 555 would fluidly couple the fuel cavity 110 and the channel 140.

A fuel orifice distance 560 can be measured from a fuel orifice centerline 556 to the axial end 130 of the center body 104. The fuel orifice distance 560 can be between or equal to 0.0 centimeters and 2.0 centimeters. It is contemplated that the fuel orifice distance 560 can be between or equal to 0%-50% of the center body length. It is further contemplated that the fuel orifice distance 560 can be between or equal to 0%-100% of the diameter of the center body 104 at the axial end 130.

It is contemplated that even if the first set of fuel orifices 512a and the second set of fuel orifices 512b do not axial align, that the distance between each orifice of the first set of fuel orifices 512a and the second set of fuel orifices 512b have a fuel orifice distance equal to or less than 2.0 centimeters or 0%-50% of the center body length.

A constant area portion 562 of the air passage 106 can be located between the plurality of fuel orifices 512 and the axial end 130. That is, an air passage diameter 536 is constant between at least a first point 564 downstream of the plurality of fuel orifices 512 and a second point 566 downstream of the first point 564, wherein the second point 566 is at the axial end 130, as illustrated, or upstream of the axial end 130.

In operation, one or both of the first set of fuel orifices 512a or the second set of fuel orifices 512b can be used to provide fuel to the air passage 106. The contribution or activation of one or more or one or more sets of the plurality of fuel orifices 512 allows for fuel injection from both the center body 104 and the outer surface or the outer wall 102. Providing fuel from more than one radial location can improve control of the mixing of the fuel from the plurality of fuel orifices 512 and the airflow in the air passage 106. This can improve engine response, as different fuel-air mixtures are needed during different portions of a cycle of operation of the turbine engine 10.

Similarly, when fuel is from the plurality of fuel orifices 512 on the center body 104 and the outer wall 102 is provided to an airflow in the air passage 106, there is better fuel penetration circumferentially, as the fuel is added radially from the outside and inside of the airflow. This helps to keep the fuel-air mixture in the center of the air passage 106. When the fuel-air mixture is centered in the air passage 106, when the fuel-air mixture is ignited downstream of the center body 104, a lifted flame is provided. That is, the flame is spaced from the center body 104. Having a lifted flame further prevents flame holding and flashback.

FIG. 10 is cross section along line X-X of FIG. 9 at the fuel orifice centerline 556 further illustrating the first set of fuel orifices 512a and the second set of fuel orifices 512b. The first set of fuel orifices 512a extend through a portion of the outer wall 102 to the outer wall inner surface 120. That is, the first set of fuel orifices 512a fluidly couple the fuel source with the air passage 106. The second set of fuel orifices 512b extend through a portion of the center body outer surface 124 to the center body inner surface 126. That is, the second set of fuel orifices 512b fluidly couple the air passage 106 with the fuel cavity 110. An orifice set angle 509 can be defined as the angle between a centerline of at least one orifice of the first set of fuel orifices 512a and a centerline of at least one orifice of the second set of fuel orifices 512b, where the centerlines are drawn extending from the centerline 142 of the fuel cavity 110. As illustrated, the orifice set angle 509 can be a non-zero angle, however any angle, including zero is contemplated, which is illustrated in FIG. 11. It is contemplated that the angle need not equal between adjacent pairs of fuel orifices and that the orifices of the first set of fuel orifices 512a and the second set of fuel orifices 512b need not to be uniformly distributed about the circumference of the center body 104 or the outer wall 102.

Optionally, the protrusion passages 555 can fluidly couple the channel 140 with the fuel cavity 110. The protrusion passages 555 can align with one or more of the first set of fuel orifices 512a or the second set of fuel orifices 512b. Alternatively, the protrusion passages 555 can be form a non-zero angle with both the first set of fuel orifices 512a and the second set of fuel orifices 512b. That is, there can be any number of protrusion passages 555 that can be circumferentially located at any location in alignment with or between the first set of fuel orifices 512a or the second set of fuel orifices 512b.

Figure 12:
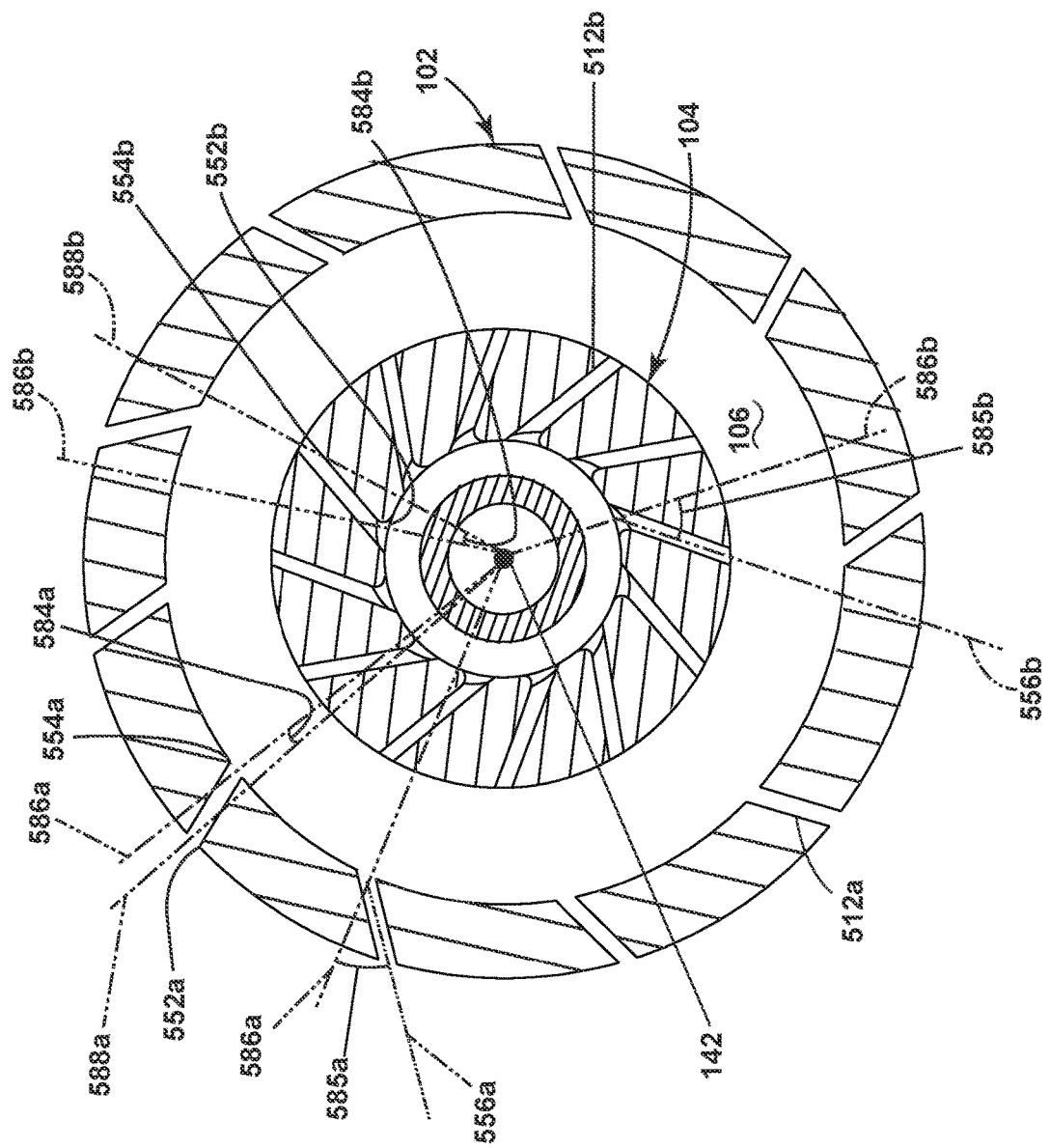
FIG. 12 is another variation of the cross section of FIG. 10 in accordance with an exemplary embodiment of the present disclosure.

FIG. 12 is yet another variation of the cross section of FIG. 10 taken at the fuel orifice centerline 556 (FIG. 9) further illustrating the first set of fuel orifices 512a and the second set of fuel orifices 512b.

A first orifice angle 584a for the first set of fuel orifices 512a can be defined as the angle between a first radius 586a extending from the centerline 142 through the outlet 554a and a second radius 588a extending from the centerline 142 through the inlet 552a. As illustrated, the orifice angle can be non-zero. Any angle value, including zero, is also contemplated.

A second orifice angle 584b for the second set of fuel orifices 512b can be defined as the angle between a first radius 586b extending from the centerline 142 through the inlet 552b and a second radius 588b extending from the centerline 142 through the outlet 554b. As illustrated, the orifice angle can be non-zero. Any angle value, including zero, is also contemplated.

As illustrated, by way of example, the clockwise or counterclockwise angle of the first set of fuel orifices 512a can be opposite that of the second set of fuel orifices 512b. It is contemplated that first orifice angle 584a or the second orifice angle 584b can be between or equal to −60 degrees to 60 degrees. That is, 60 degrees counterclockwise to 60 degrees clockwise. It is further contemplated that the first set of fuel orifices 512a can be between or equal to zero degrees and 30 degrees.

A first centerline angle 585a for the first set of fuel orifices 512a can be defined as the angle between the first radius 586a extending from the centerline 142 through the outlet 554a and a first fuel orifice centerline 556a. As illustrated, the first centerline angle 585a can be non-zero. Any angle value, including zero, is also contemplated.

A second centerline angle 585b for the second set of fuel orifices 512b can be defined as the angle between the first radius 586b extending from the centerline 142 through the inlet 552b and a second fuel orifice centerline 556b. As illustrated, the second centerline angle 585b can be non-zero. Any angle value, including zero, is also contemplated.

As illustrated, by way of example, the clockwise or counterclockwise centerline angle of the first set of fuel orifices 512a can be opposite that of the second set of fuel orifices 512b. It is contemplated that first centerline angle 585a or the second centerline angle 585b can be between or equal to −60 degrees to 60 degrees. That is, 60 degrees counterclockwise to 60 degrees clockwise.

Figure 13:
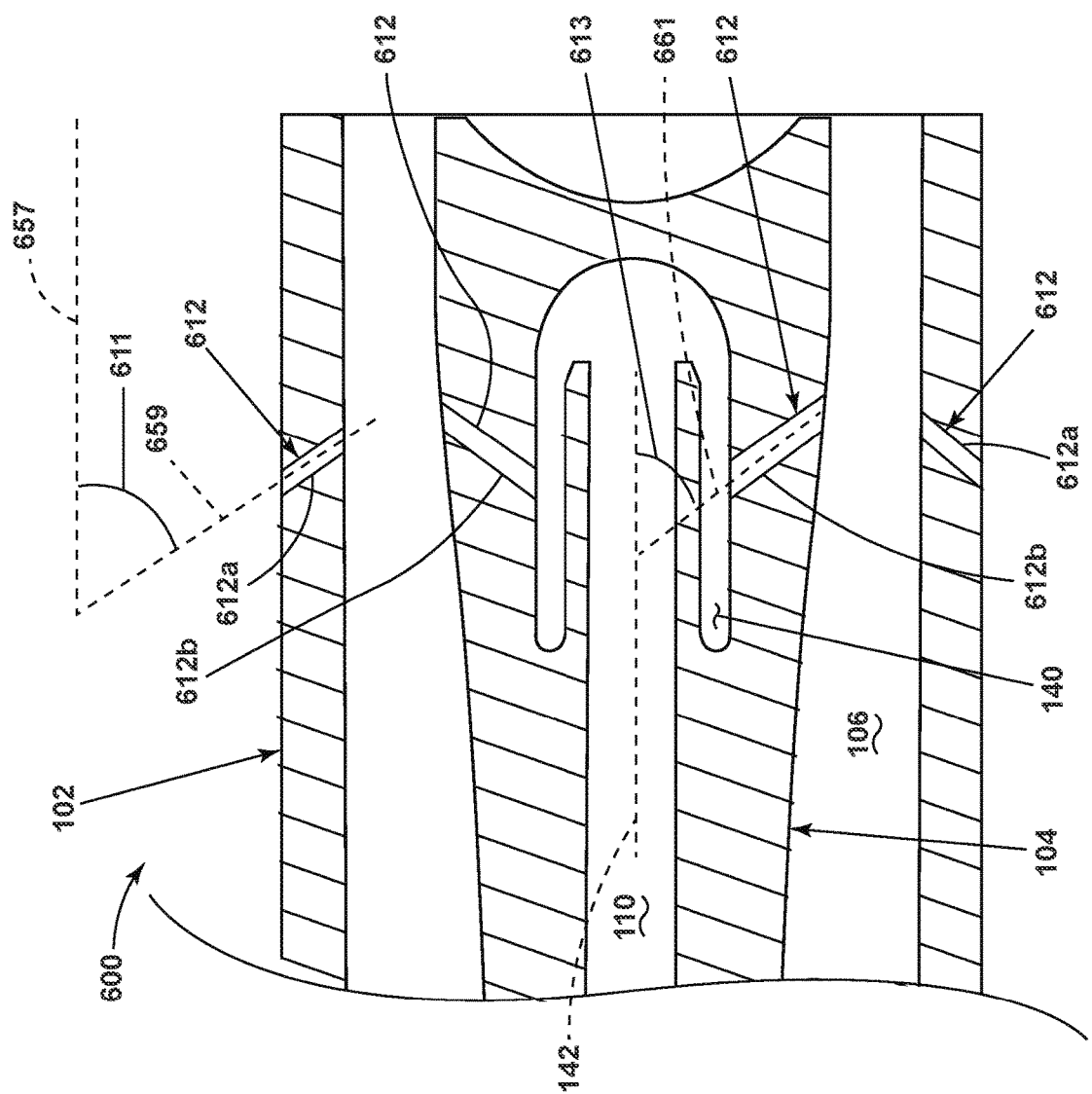
FIG. 13 is still yet another variation of the cross section of FIG. 2 in accordance with an exemplary embodiment of the present disclosure.

FIG. 13 illustrates another cross section of a portion of the combustion section 14 (FIG. 1) further illustrating a fuel-air mixing assembly 600. The fuel-air mixing assembly 600 is similar to the fuel-air mixing assembly 100, 200, 400, 500 therefore, like parts will be identified with like numerals increased by 100 with it being understood that the description of the like parts of the fuel-air mixing assembly 100, 200, 400, 500 applies to the fuel-air mixing assembly 600, unless otherwise noted. The fuel-air mixing assembly 600 includes at least the outer wall 102 with the plurality of apertures (not shown), the center body 104, the air passage 106, the fuel cavity 110, and a plurality of fuel orifices 612.

The plurality of fuel orifices 612 include a first set of fuel orifices 612a and a second set of fuel orifices 612b. The first set of fuel orifices 612a pass through at least a portion of the outer wall 102. The first set of fuel orifices 612a fluidly couple the air passage 106 with a fuel tank (not shown) or other fuel source to provide fuel to the air passage 106.

The second set of fuel orifices 612b pass through a portion of the center body 104. The second set of fuel orifices 612b fluidly couple the channel 140 with the air passage 106 to provide fuel to the air passage 106, wherein the channel 140 is fluidly coupled to the fuel cavity 110.

A first angle 611 can be defined as the angle between a reference line 657 and a fuel orifice centerline 659 of at least one of the fuel orifices of the first set of fuel orifices 612a. The reference line 657 can be parallel to the centerline 142 of the fuel cavity 110 or the centerline of the turbine engine 10. As illustrated, the first angle 611 can be a non-zero angle, however any angle greater than zero is contemplated.

A second angle 613 can be defined as the angle between the centerline 142 of the fuel cavity 110 and a fuel orifice centerline 661 of at least one of the fuel orifices of the second set of fuel orifices 612b. As illustrated, the second angle 613 can be a non-zero angle, however any angle greater than zero is contemplated.

It is contemplated that the first angle 611 can be equal to or between 30 degrees to 150 degrees. It is further contemplated that the second angle 613 can be equal to or between 30 degrees to 150 degrees.

Figure 14:
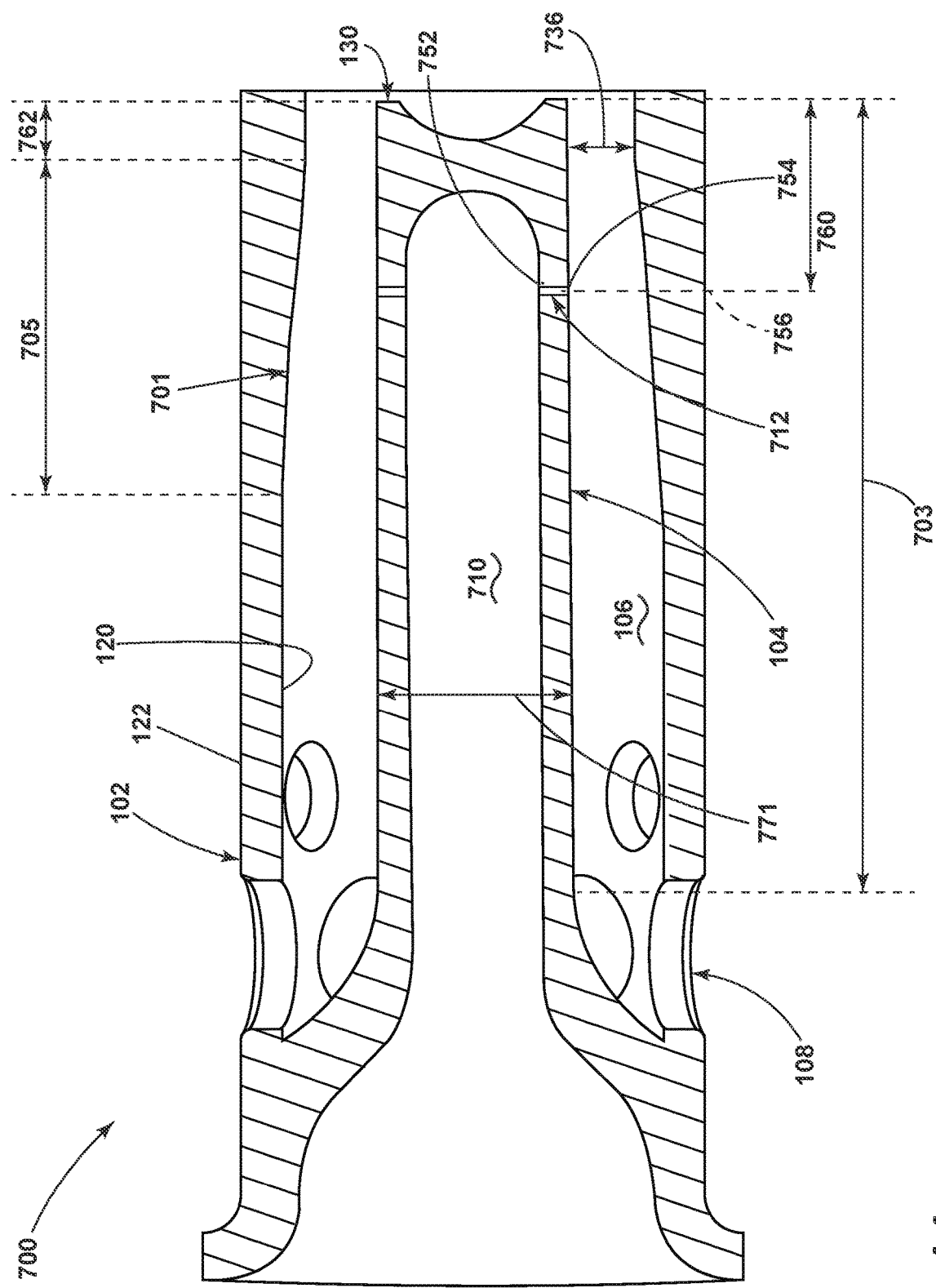
FIG. 14 is another variation of the cross section of FIG. 2 in accordance with an exemplary embodiment of the present disclosure.

FIG. 14 illustrates another cross section of a portion of the combustion section 14 (FIG. 1) further illustrating a fuel-air mixing assembly 700. The fuel-air mixing assembly 700 is similar to the fuel-air mixing assembly 100, 200, 400, 500, 600 therefore, like parts will be identified with like numerals increased by 100 with it being understood that the description of the like parts of the fuel-air mixing assembly 100, 200, 400, 500, 600 applies to the fuel-air mixing assembly 700, unless otherwise noted. The fuel-air mixing assembly 700 includes at least the outer wall 102 with the plurality of apertures 108, the center body 104, the air passage 106, a fuel cavity 710, and a plurality of fuel orifices 712.

A reducing cross-section area portion or reduction portion 701 can be formed with or coupled to the outer wall inner surface 120 and include a sloped or angled portion 705 that decreases the diameter of the air passage 106. Axially downstream or upstream of the angled portion 705 can be a constant area portion 762, where an air passage diameter 736 remains constant.

While illustrated as a portion of the outer wall inner surface 120, it is contemplated that the converging, sloped, or angled portion 705 can extend axially past the axial end 130. It is also contemplated that the downstream end of the angled portion 705 can be within a distance of the fuel outlet 754 that is 10% or less of the diameter of the center body 104 at the axial end 130.

It is contemplated that the center body 104, as illustrated, can have a cylindrical section 703, where a diameter 771 of the center body 104 doesn't change by more than 5%. That is, in the cylindrical section 703, the center body 104 is generally a hollow cylindrical shape. The cylindrical section 703 of the center body 104 can axially overlap the angled portion 705 the reduction portion 701.

The fuel cavity 710 can be defined by the center body 104. That is, the fuel cavity 710 is the hollow center of the center body 104. A fuel inlet 752 allows fuel from the fuel cavity 710 to enter the plurality of fuel orifices 712. A fuel outlet 754 fluidly couples the plurality of fuel orifices 712 to the air passage 106. That is, the fuel cavity 710 is fluidly coupled to the air passage 106 via the plurality of fuel orifices 712. Optionally, the fuel cavity 710 can include channels that fluidly couple the fuel cavity 710 to the plurality of fuel orifices 712.

A fuel orifice centerline 756 can axially align with the angled portion 705, as illustrated. However, it is contemplated that the fuel orifice centerline 756 can also axially align with the constant area portion 762. A fuel orifice distance 760 can be measured from the fuel orifice centerline 756 to the axial end 130 of the center body 104. The fuel orifice distance 760 can be between or equal to 0.0 centimeters and 2.0 centimeters. It is contemplated that the fuel orifice distance 760 can be between or equal to 0%-50% of the center body length. Additionally, or alternatively, the fuel orifice distance 760 can be between or equal to 0% to 100% of the diameter of the center body 104 at the axial end 130.

Benefits associated with the disclosure as described herein include improvement to the mixing of fuel and air in a turbine engine, especially when the fuel burns hotter than traditional fuels, which permits increase in fuel efficiency or reduction in emissions.

The plurality of fuel orifices provide fuel to the airflow in the air passage once the airflow is established. That is, one benefit is the cross-flow fuel injection of the fuel into the airflow once the airflow is developed. Injecting fuel once airflow is developed in low turbulent region of the airflow reduces flame holding.

The plurality of fuel orifices can include, but are not limited to, any combination of axial locations, axial angles, radial angles, diameters, or cross section shapes. Being able to customize these characteristics of each orifice of the plurality of fuel orifices provides can improve the uniformity of the fuel-air mixture.

Another benefit can be a constant passage area in the air passage downstream of the plurality of fuel orifices. The constant passage area maintains well defined high velocity flow aft of injection to reduce or eliminate flame holding or flashback when using fuels such as hydrogen-containing fuels.

The plurality of fuel orifices, as stated above, can inject fuel in a low turbulence region, however the axial location of the plurality of fuel orifices 2.0 centimeters or less from the axial end of the center body, can provide the additional of a shorter mixing length. The shorter mixing length can also reduce flame holding.

The angle of the plurality of fuel orifices can be partially tangential to one or more portions of the airflow to improve mixing in the shortened mixing section.

The plurality of fuel orifices can be inclined towards the axial end of the center body (or in the direction of the airflow) to allow the fuel to follow the air velocity and reduce wakes due to fuel injection itself. The reduction of the wakes reduces flash back.

Fuel can be injected from sets of fuel orifices on both the center body and the outer wall to achieve better mixing and control the fuel, improving fuel penetration circumferentially into the airflow. Centrally located fuel-air mixtures helps to keep the fuel-air mixtures in the center of the air passage. Once the fuel-air mixture passes the axial end of the center body and is ignited, the centrally located fuel-air mixture provides a lifted flame. A lifted flame also reduces the chance of flame holding.

Fuel injection from the center body and/or the outer wall can be inclined. Alternatively, one set or subset of the plurality of fuel injection orifices can be inclined, while another set remains radial.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A turbine engine comprising an engine core comprising at least a compressor section and a combustion section in serial flow arrangement, wherein the combustion section comprises at least one fuel-air mixing assembly comprising a center body extending axially from a fore end to an aft end to define a center body axis, an outer wall spaced from and circumscribing the center body, an annular flow passage defined between the outer wall and the center body, and having an inlet at the fore end and an outlet at the aft end, with the annular flow passage having a constant cross-sectional area portion along a predetermined portion of the center body and terminating at the aft end, and at least one fuel orifice having a fuel outlet opening into the annular flow passage at a predetermined distance from the aft end of the center body.

The turbine engine of any of the preceding clauses wherein the predetermined distance is 0% to 50% of a center body length.

The turbine engine of any of the preceding clauses wherein the predetermined distance is less than 25% of the center body length.

The turbine engine of any of the preceding clauses wherein the fuel outlet opens at the constant cross-sectional area portion.

The turbine engine of any of the preceding clauses wherein the predetermined distance is between 0.0 to 2.0 centimeters from the aft end.

The turbine engine of any of the preceding clauses wherein the fuel outlet opens at the constant cross-sectional area portion.

The turbine engine of any of the preceding clauses wherein the center body comprises a fuel cavity and the at least one fuel orifice has a fuel inlet fluidly coupled to the fuel cavity.

The turbine engine of any of the preceding clauses wherein the at least one fuel orifice extends through the center body.

The turbine engine of any of the preceding clauses wherein the fuel cavity comprises a channel, extending in the aft-to-fore direction, and the fuel inlet is fluidly coupled to the channel.

The turbine engine of any of the preceding clauses where the channel extends an axial distance between 2% to 50% of the center body length.

The turbine engine of any of the preceding clauses wherein the at least one fuel orifice extends through the outer wall.

The turbine engine of any of the preceding clauses wherein the at least one fuel orifice comprises at least a first set of fuel orifices axially or radially spaced from a second set of fuel orifices.

The turbine engine of any of the preceding clauses wherein the second set of fuel orifices is circumferentially offset from the first set of fuel orifices.

The turbine engine of any of the preceding clauses wherein at least some of the fuel orifices, of at least one of the first set of fuel orifices or the second set of fuel orifices, are radially angled or axially angled relative to the center body axis.

The turbine engine of any of the preceding clauses wherein the annular flow passage comprises a reducing cross-sectional area portion located upstream of the constant cross-sectional area portion.

The turbine engine of any of the preceding clauses wherein the reducing cross-sectional area portion terminates at the beginning of the constant cross-sectional area portion.

A combustor, for a turbine engine, having a fuel-air mixing assembly comprising a center body extending axially from a fore end to an aft end to define a center body axis, an outer wall spaced from and circumscribing the center body, an annular flow passage defined between the outer wall and the center body, and having an inlet at the fore end and an outlet at the aft end, with the annular flow passage having a constant cross-sectional area along a predetermined portion of the center body and terminating at the aft end, and at least one fuel orifice having a fuel outlet opening into the annular flow passage at a predetermined distance from the aft end of the center body.

The combustor of any of the preceding clauses wherein the fuel outlet opens at the constant cross-sectional area portion.

The combustor of any of the preceding clauses wherein the at least one fuel orifice further comprises a fuel inlet fluidly coupled to at least one of a hydrogen fuel tank, a hydrogen channel, a hydrogen fuel cavity, or a hydrogen outside fuel source.

The combustor of any of the preceding clauses wherein the annular flow passage comprises a reducing cross-sectional area portion located upstream of the constant cross-sectional area portion.

What is claimed is:

1. A turbine engine comprising:
    an engine core comprising at least a compressor section and a combustion section in serial flow arrangement, wherein the combustion section comprises at least one fuel-air mixing assembly comprising:
        a center body arranged about a fuel cavity defining a centerline;
        a channel arranged within the center body, fluidly coupled to the fuel cavity and arranged exterior of the fuel cavity;
        an outer wall spaced from and circumscribing the center body, and defining an annular flow passage between the outer wall and the center body;
        a first set of fuel orifices arranged in the center body and fluidly coupling the channel to the annular flow passage; and
        a second set of fuel orifices arranged in the center body and fluidly coupling the channel to the annular flow passage, wherein the second set of fuel orifices is axially spaced from the first set of fuel orifices relative to the centerline.

2. The turbine engine of claim 1, wherein the first set of fuel orifices is circumferentially offset from the second set of fuel orifices, relative to a radius extending from the centerline.

3. The turbine engine of claim 1, wherein at least one of the first set of fuel orifices or the second set of fuel orifices are arranged at an orifice centerline angle relative to a radius extending from the centerline, and wherein the orifice centerline angle is between or equal to −60 degrees to 60 degrees relative to the radius extending from the centerline.

4. The turbine engine of claim 3, wherein the orifice centerline angle is between 0 degrees to 30 degrees.

5. The turbine engine of claim 4, wherein a first radius is defined extending from the centerline through an inlet of each orifice of the first set of fuel orifices and the second set of fuel orifices;
    wherein a second radius is defined extending from the centerline through an outlet of each orifice of the first set of fuel orifices and the second set of fuel orifices;
    wherein an orifice angle is defined between the first radius and the second radius for each orifice of the first set of fuel orifices and the second set of fuel orifices; and
    wherein the first set of fuel orifices or the second set of fuel orifices being arranged at the orifice centerline angle are further arranged at the orifice angle, with the orifice angle being defined between or equal to −60 degrees to 60 degrees.

6. The turbine engine of claim 5, wherein the orifice angle is between 0 degrees and 30 degrees.

7. The turbine engine of claim 1, wherein the outer wall further comprises a reduction portion defining a reducing cross-sectional area along the annular flow passage.

8. The turbine engine of claim 7, wherein the reducing cross-sectional area of the reduction portion is positioned upstream of the first set of fuel orifices and the second set of fuel orifices, relative to a flow direction through the annular flow passage.

9. The turbine engine of claim 8, wherein the reduction portion defines a constant cross-sectional area for the annular flow passage downstream of the first set of fuel orifices and the second set of fuel orifices, relative to the flow direction through the annular flow passage.

10. The turbine engine of claim 9, wherein the center body further comprises a cylindrical section defining a constant diameter along at least a portion of the center body.

11. The turbine engine of claim 10, wherein the cylindrical section overlaps the reducing cross-sectional area of the reduction portion, relative to a radius extending from the centerline.

12. The turbine engine of claim 1, wherein the center body extends between a forward end and an aft end, and wherein the center body includes a constant area portion at the aft end including a constant cross-sectional area along the constant area portion.

13. The turbine engine of claim 12, wherein the annular flow passage includes a constant cross-sectional area along the constant area portion of the center body.

14. A fuel-air mixing assembly comprising:
- a center body with a center body outer surface, the center body arranged about a fuel cavity defining a centerline;
- a channel arranged within the center body, fluidly coupled to the fuel cavity and arranged exterior of the fuel cavity;
- a first set of fuel orifices arranged in the center body and extending between the center body outer surface and the channel; and
- a second set of fuel orifices arranged in the center body and extending between the center body outer surface and the channel, and wherein the second set of fuel orifices is axially spaced from the first set of fuel orifices relative to the centerline.

15. The fuel-air mixing assembly of claim 14, wherein the first set of fuel orifices is circumferentially offset from the second set of fuel orifices.

16. The fuel-air mixing assembly of claim 14, wherein at least one of the first set of fuel orifices or the second set of fuel orifices are arranged at an orifice centerline angle relative to a radius extending from the centerline, and wherein the orifice centerline angle is between or equal to −60 degrees to 60 degrees relative to the radius extending from the centerline.

17. The fuel-air mixing assembly of claim 16, wherein both the first set of fuel orifices and the second set of fuel orifices are arranged at the orifice centerline angle.

18. The fuel-air mixing assembly of claim 16, wherein the orifice centerline angle is between 0 degrees to 30 degrees.

19. The fuel-air mixing assembly of claim 14, wherein a first radius is defined extending from the centerline through an inlet of each orifice of the first set of fuel orifices and the second set of fuel orifices;
- wherein a second radius is defined extending from the centerline through an outlet of each orifice of the first set of fuel orifices and the second set of fuel orifices;
- wherein an orifice angle is defined between the first radius and the second radius; and
- wherein at least one of the first set of fuel orifices or the second set of fuel orifices are arranged at the orifice angle, with the orifice angle being between or equal to −60 degrees to 60 degrees.

20. The fuel-air mixing assembly of claim 19, wherein the center body extends between a forward end and an aft end, and wherein the center body includes a constant area portion at the aft end including a constant cross-sectional area along the constant area portion.

* * * * *